U S 0 1 1 7 2 8 9 7 8 B 2

US011728978B2

(12) United States Patent
Zhou et al.

(10) Patent No.: US 11,728,978 B2
(45) Date of Patent: *Aug. 15, 2023

(54) METHOD AND APPARATUS FOR ESTABLISHING TRUSTED CHANNEL BETWEEN USER AND TRUSTED COMPUTING CLUSTER

(71) Applicant: Advanced New Technologies Co., Ltd., Grand Cayman (KY)

(72) Inventors: Aihui Zhou, Zhejiang (CN); Qunshan Huang, Zhejiang (CN); Chaofan Yu, Zhejiang (CN); Weiwen Cai, Zhejiang (CN); Lei Wang, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 15 days.

This patent is subject to a terminal disclaimer.

(21) Appl. No.: 17/401,064

(22) Filed: Aug. 12, 2021

(65) Prior Publication Data
US 2022/0021520 A1 Jan. 20, 2022

Related U.S. Application Data

(63) Continuation of application No. 17/158,987, filed on Jan. 26, 2021, now Pat. No. 11,121,865, which is a (Continued)

(30) Foreign Application Priority Data

Dec. 12, 2018 (CN) .......................... 201811521029.9

(51) Int. Cl.
*H04L 9/08* (2006.01)
*H04L 9/32* (2006.01)

(52) U.S. Cl.
CPC ............ *H04L 9/083* (2013.01); *H04L 9/0822* (2013.01); *H04L 9/0825* (2013.01); *H04L 9/0861* (2013.01); *H04L 9/3215* (2013.01)

(58) Field of Classification Search
CPC ..... H04L 9/083; H04L 9/0822; H04L 9/0825; H04L 9/0861; H04L 9/3215;
(Continued)

(56) References Cited

U.S. PATENT DOCUMENTS

| 8,176,336 B1* | 5/2012 | Mao | .................... | G06F 9/45558 |
| | | | | 713/189 |
| 8,954,740 B1* | 2/2015 | Moscaritolo | .......... | H04L 63/065 |
| | | | | 380/278 |

(Continued)

FOREIGN PATENT DOCUMENTS

| CA | 2731006 A1 | 8/2011 |
| CN | 1415158 A | 4/2003 |

(Continued)

OTHER PUBLICATIONS

3GPP Technical Specification Group Services and System Aspects, 3GPP System Architecture Evolution (SAE), Security Architecture (Release 12), GPP TS 133.401, V12.16.0, 2015.

*Primary Examiner* — J. Brant Murphy
(74) *Attorney, Agent, or Firm* — Seed IP Law Group LLP

(57) ABSTRACT

Some embodiments of the present specification provide a method and an apparatus for establishing a trusted channel between a user and a trusted computing cluster. According to the method, when a user wants to establish a trusted channel with a trusted computing cluster, the user only negotiates a session key with any first trusted computing unit in the cluster to establish the trusted channel. Then, the first trusted computing unit encrypts the session key using a cluster key common to the trusted computing cluster to which the first trusted computing unit belongs, and sends the (Continued)

encrypted session key to a cluster manager. The cluster manager transmits the encrypted session key in the trusted computing cluster, so that other trusted computing units in the cluster obtain the session key and join the trusted channel. Thus, the user establishes a trusted channel with the entire trusted computing cluster.

20 Claims, 6 Drawing Sheets

Related U.S. Application Data continuation of application No. PCT/CN2019/112645, filed on Oct. 23, 2019.

(58) Field of Classification Search
CPC ............ H04L 63/065; H04L 2463/062; H04L 9/0891; H04L 9/14; H04L 63/0428
See application file for complete search history.

(56) References Cited

U.S. PATENT DOCUMENTS

| | | | | |
|---|---|---|---|---|
| 2003/0044020 A1* | 3/2003 | Aboba | .................... | H04L 63/04 |
| | | | | 380/278 |
| 2004/0054891 A1* | 3/2004 | Hengeveld | ............ | H04L 9/0863 |
| | | | | 380/278 |
| 2004/0210767 A1* | 10/2004 | Sinclair | ...................... | H04L 9/40 |
| | | | | 726/6 |
| 2005/0223217 A1* | 10/2005 | Howard | .............. | H04L 63/0807 |
| | | | | 713/155 |
| 2007/0003064 A1* | 1/2007 | Wiseman | .............. | H04L 9/0836 |
| | | | | 380/281 |
| 2007/0076889 A1* | 4/2007 | DeRobertis | ............. | H04L 9/083 |
| | | | | 380/279 |
| 2007/0297613 A1* | 12/2007 | Ghosh | ................... | H04L 63/065 |
| | | | | 380/277 |
| 2008/0159541 A1* | 7/2008 | Kumar | .................... | G06F 21/57 |
| | | | | 380/278 |
| 2009/0300358 A1* | 12/2009 | Pang | ................. | H04W 12/0431 |
| | | | | 380/46 |
| 2010/0162036 A1* | 6/2010 | Linden | ................... | H04L 63/20 |
| | | | | 714/4.11 |
| 2010/0332829 A1* | 12/2010 | Baroffio | ............. | H04N 7/17318 |
| | | | | 713/168 |
| 2012/0189117 A1* | 7/2012 | Devanand | ............ | H04L 9/3236 |
| | | | | 380/28 |
| 2013/0002968 A1* | 1/2013 | Bridge | .................... | H04N 19/97 |
| | | | | 348/744 |
| 2013/0003968 A1* | 1/2013 | Kang | ...................... | H04L 9/083 |
| | | | | 380/46 |
| 2013/0108050 A1* | 5/2013 | Wu | ........................ | H04L 9/0833 |
| | | | | 380/277 |
| 2015/0195261 A1* | 7/2015 | Gehrmann | ............ | H04L 9/0833 |
| | | | | 726/7 |
| 2017/0083716 A1* | 3/2017 | Sun | ............................ | H04L 9/14 |
| 2019/0005274 A1* | 1/2019 | Field | ................... | H04L 63/0428 |
| 2020/0067912 A1* | 2/2020 | Block | ................... | H04L 9/0897 |

FOREIGN PATENT DOCUMENTS

| | | |
|---|---|---|
| CN | 1564514 A | 1/2005 |
| CN | 101170404 A | 4/2008 |
| CN | 101594386 A | 12/2009 |
| CN | 101651543 A | 2/2010 |
| CN | 102244577 A | 11/2011 |
| CN | 102986163 A | 3/2013 |
| CN | 103051455 A | 4/2013 |
| CN | 103828289 A | 5/2014 |
| CN | 103856477 A | 6/2014 |
| CN | 103959735 A | 7/2014 |
| CN | 105790938 A | 7/2016 |
| CN | 105915502 A | 8/2016 |
| CN | 106101252 A | 11/2016 |
| CN | 106332074 A | 1/2017 |
| CN | 106991329 A | 7/2017 |
| CN | 206611427 U | 11/2017 |
| CN | 107924445 A | 4/2018 |
| CN | 108259469 A | 7/2018 |
| CN | 108491727 A | 9/2018 |
| CN | 108833522 A | 11/2018 |
| CN | 108847928 A | 11/2018 |
| CN | 109861980 A | 6/2019 |
| CN | 109873801 A | 6/2019 |
| EP | 1396972 A2 | 3/2004 |
| WO | WO 2012159272 A1 | 11/2012 |
| WO | WO 2013046088 A1 | 4/2013 |

\* cited by examiner

METHOD AND APPARATUS FOR ESTABLISHING TRUSTED CHANNEL BETWEEN USER AND TRUSTED COMPUTING CLUSTER

BACKGROUND

Technical Field

One or more implementations of the present specification relate to the secure computing field, and in particular, to a method and an apparatus for establishing a trusted channel with a trusted computing cluster.

Description of the Related Art

For the security of computing and data transmission, trusted computing units are usually used for trusted computing and data processing. The trusted computing unit can ensure that the code execution is secure, and those outside, including an operating system or a driver, cannot obtain secrets such as an internal runtime memory.

Before user equipment exchanges to-be-processed data with a trusted computing unit, a same encrypted key is usually obtained through negotiation first, and this key is impossible for anyone to crack except for two communication parties. The data transmission between the two parties is encrypted using the key obtained through negotiation. Thus, it is considered that the user equipment has established a trusted channel with the trusted computing unit, and can securely transmit confidential data on the trusted channel.

In many cases, the user equipment communicates with a plurality of trusted computing units in a trusted computing platform. For this reason, the user equipment usually negotiates a key with these trusted computing units separately to establish a trusted channel with these trusted computing units separately. When the number of trusted computing units in the trusted platform increases to a large value, user access becomes complicated and cumbersome and costly.

Therefore, an improved solution is needed.

BRIEF SUMMARY

One or more implementations of the present specification describe methods and apparatuses for establishing and re-establishing a trusted channel. The implementations enable a user to establish a trusted channel with the entire trusted computing cluster simply and securely.

According to a first aspect, a method for establishing a trusted channel between a user and a trusted computing cluster is provided, where the method is performed by a first trusted computing unit, wherein the first trusted computing unit belongs to a pre-established first trusted computing cluster, the first trusted computing cluster includes a plurality of trusted computing units each maintaining a same first cluster key, and the first trusted computing unit pre-registers with a cluster manager for information about the first trusted computing cluster to which the first trusted computing unit belongs, the method including: obtaining a first session key through negotiation with a user, and establishing a first trusted channel with the user, where the first session key is used to encrypt data to be transmitted through the first trusted channel; encrypting the first session key using the first cluster key to obtain a first encrypted key; and sending a first notification to the cluster manager, where the first notification includes the first encrypted key, so that the cluster manager transfers the first encrypted key to other trusted computing units in the first trusted computing cluster.

According to some embodiments, the first session key is obtained through negotiation with the user in the following manner: sending a first public key of a first key pair of the first trusted computing unit to the user, the first key pair including the first public key and a first private key, and obtaining a user public key provided by the user; and generating the first session key based on the first public key, the first private key, and the user public key.

In some embodiments, the method further includes: before sending the first notification to the cluster manager, sending an identifier request message for the first trusted channel to the cluster manager; obtaining a first session identifier allocated by the cluster manager to the first trusted channel; and including the first session identifier into the first notification.

According to a second aspect, a method for establishing a trusted channel between a user and a trusted computing cluster is provided, where the method is performed by a cluster manager, and the cluster manager is configured to manage at least one pre-established trusted computing cluster, the method including: receiving a first notification from a first trusted computing unit, where the first notification includes a first encrypted key, the first encrypted key is obtained by encrypting a first session key using a first cluster key, and the first session key is a data encryption key corresponding to a first trusted channel between the first trusted computing unit and the user; determining a first trusted computing cluster to which the first trusted computing unit belongs, where each trusted computing unit in the first trusted computing cluster maintains the first cluster key; and transferring the first encrypted key to a second trusted computing unit in the first trusted computing cluster, so that the second trusted computing unit decrypts the first encrypted key based on the first cluster key maintained by the second trusted computing unit to obtain the first session key, and thus joins the first trusted channel based on the first session key.

According to some implementations, the method further includes: allocating a first session identifier to the first trusted channel in response to an identifier request message of the first trusted computing unit for the first trusted channel; and adding the first trusted computing unit to a first trusted computing unit list corresponding to the first session identifier.

In some embodiments, the first notification further includes a first session identifier, and the method further includes: transferring the first session identifier to the second trusted computing unit; and adding the second trusted computing unit to the first trusted computing unit list.

According to some implementations, the cluster manager uses a maintained cluster information table to determine a first trusted computing cluster to which the first trusted computing unit belongs, and each trusted computing unit included in the first trusted computing cluster.

In some embodiments, the cluster manager further transfers the first encrypted key to a third trusted computing unit in the first trusted computing cluster, so that the third trusted computing unit decrypts the first encrypted key based on the first cluster key maintained by the third trusted computing unit to obtain the first session key, and thus joins the first trusted channel based on the first session key.

According to a third aspect, a method for re-establishing a trusted channel between a user and a trusted computing cluster is provided, where the method is performed by a fourth trusted computing unit, the fourth trusted computing unit has established a second trusted channel with the user, the fourth trusted computing unit belongs to a pre-established second trusted computing cluster, the second trusted computing cluster includes a plurality of trusted computing units each maintaining a same second cluster key, the fourth trusted computing unit pre-registers with a cluster manager for information about the second trusted computing cluster to which the fourth trusted computing unit belongs, and the fourth trusted computing unit obtains a second session identifier corresponding to the second trusted channel from the cluster manager, the method including: obtaining, through negotiation with the user, a second session key for the second trusted channel in response to a key update request for the second trusted channel, where the second session key is used to replace an original key of the second trusted channel to encrypt transmitted data; encrypting the second session key using the second cluster key to obtain a second encrypted key; and sending a second notification to the cluster manager, where the second notification includes the second encrypted key and the second session identifier, so that the cluster manager transfers the second encrypted key to other trusted computing units related to the second session identifier.

According to a fourth aspect, a method for re-establishing a trusted channel between a user and a trusted computing cluster is provided, where the method is performed by a cluster manager, and the cluster manager is configured to manage at least one pre-established trusted computing cluster, the method including: receiving a second notification from a fourth trusted computing unit, where the fourth trusted computing unit belongs to a pre-established second trusted computing cluster, the second trusted computing cluster includes a plurality of trusted computing units each maintaining a same second cluster key, the second notification includes a second session identifier and a second encrypted key, the second session identifier corresponds to a second trusted channel that has been established between the fourth trusted computing unit and the user, the second encrypted key is obtained by encrypting a second session key using the second cluster key, and the second session key is an updated key for the second trusted channel; obtaining, based on the second session identifier, a second trusted computing unit list of trusted computing units that join the second trusted channel, where the second trusted computing unit list includes the fourth trusted computing unit and at least one other trusted computing unit belonging to the second trusted computing cluster; removing each of the at least one other trusted computing units from the second trusted computing unit list; and transferring the second encrypted key to a fifth trusted computing unit of the at least one other trusted computing units, so that the fifth trusted computing unit decrypts the second encrypted key based on the second cluster key maintained by the fifth trusted computing unit to obtain the second session key, and thus rejoins the second trusted channel based on the second session key.

In some embodiments, the method further includes: adding the fifth trusted computing unit to the second trusted computing unit list.

According to a fifth aspect, an apparatus for establishing a trusted channel between a user and a trusted computing cluster is provided, where the apparatus is deployed in a first trusted computing unit, the first trusted computing unit belongs to a pre-established first trusted computing cluster, the first trusted computing cluster including a plurality of trusted computing units each maintaining a same first cluster key, and the first trusted computing unit pre-registers with a cluster manager for information about the first trusted computing cluster to which the first trusted computing unit belongs, the apparatus including: a key negotiation module, configured to obtain a first session key through negotiation with a user, and establish a first trusted channel with the user, where the first session key is used to encrypt data to be transmitted through the first trusted channel; a first encryption module, configured to encrypt the first session key using the first cluster key to obtain a first encrypted key; and a first notification sending module, configured to send a first notification to the cluster manager, where the first notification includes the first encrypted key, so that the cluster manager transfers the first encrypted key to other trusted computing units in the first trusted computing cluster.

According to a sixth aspect, an apparatus for establishing a trusted channel between a user and a trusted computing cluster is provided, where the apparatus is deployed in a cluster manager, and the cluster manager is configured to manage at least one pre-established trusted computing cluster, the apparatus including: a first notification receiving module, configured to receive a first notification from a first trusted computing unit, where the first notification includes a first encrypted key, the first encrypted key is obtained by encrypting a first session key using a first cluster key, and the first session key is a data encryption key corresponding to a first trusted channel between the first trusted computing unit and the user; a cluster determination module, configured to determine a first trusted computing cluster to which the first trusted computing unit belongs, where each trusted computing unit in the first trusted computing cluster maintains the first cluster key; and a first transferring module, configured to transfer the first encrypted key to a second trusted computing unit in the first trusted computing cluster, so that the second trusted computing unit decrypts the first encrypted key based on the first cluster key maintained by the second trusted computing unit to obtain the first session key, and thus joins the first trusted channel based on the first session key.

According to a seventh aspect, an apparatus for re-establishing a trusted channel between a user and a trusted computing cluster is provided, where the apparatus is deployed in a fourth trusted computing unit, the fourth trusted computing unit has established a second trusted channel with the user, the fourth trusted computing unit belongs to a pre-established second trusted computing cluster, the second trusted computing cluster including a plurality of trusted computing units each maintaining a same second cluster key, the fourth trusted computing unit pre-registers with a cluster manager for information about the second trusted computing cluster to which the fourth trusted computing unit belongs, and the fourth trusted computing unit obtains a second session identifier corresponding to the second trusted channel from the cluster manager, the apparatus including: a key update module, configured to obtain, through negotiation with the user, a second session key for the second trusted channel in response to a key update request for the second trusted channel, where the second session key is used to replace an original key of the second trusted channel to encrypt transmitted data; a second encryption module, configured to encrypt the second session key using the second cluster key to obtain a second encrypted key; and a second notification sending module, configured to send a second notification to the cluster manager, where the second notification includes the second encrypted key and the second session identifier, so that the cluster manager transfers the second encrypted key to other trusted computing units related to the second session identifier.

According to an eighth aspect, an apparatus for re-establishing a trusted channel between a user and a trusted computing cluster is provided, where the apparatus is deployed in a cluster manager, and the cluster manager is configured to manage at least one pre-established trusted computing cluster, the apparatus including: a second notification receiving module, configured to receive a second notification from a fourth trusted computing unit, where the fourth trusted computing unit belongs to a pre-established second trusted computing cluster, the second trusted computing cluster includes a plurality of trusted computing units each maintaining a same second cluster key, the second notification includes a second session identifier and a second encrypted key, the second session identifier corresponds to a second trusted channel that has been established between the fourth trusted computing unit and the user, the second encrypted key is obtained by encrypting a second session key using the second cluster key, and the second session key is an updated key for the second trusted channel; a second list acquisition module, configured to obtain, based on the second session identifier, a second trusted computing unit list of trusted computing units that join the second trusted channel, where the second trusted computing unit list includes the fourth trusted computing unit and at least one other trusted computing unit belonging to the second trusted computing cluster; a removing module, configured to remove each of the at least one other trusted computing units from the second trusted computing unit list; and a second transferring module, configured to transfer the second encrypted key to a fifth trusted computing unit of the at least one other trusted computing units, so that the fifth trusted computing unit decrypts the second encrypted key based on the second cluster key maintained by the fifth trusted computing unit to obtain the second session key, and thus rejoins the second trusted channel based on the second session key.

According to a ninth aspect, a computer-readable storage medium is provided, where the computer-readable storage medium stores a computer program, and when the computer program is executed in a computer, the computer is enabled to perform the methods according to the first aspect to the fourth aspect.

According to a tenth aspect, a computing device is provided, including a memory and a processor, where the memory stores executable code, and the processor executes the executable code to implement the methods according to the first aspect to the fourth aspect.

According to the methods and apparatuses provided in the embodiments of the present specification, when a user wants to establish a trusted channel with a trusted computing cluster, the user only negotiates a session key with any one of the trusted computing units in the cluster to establish the trusted channel. Then, a cluster manager transmits an encrypted session key in the trusted computing cluster, so that other trusted computing units in the cluster obtain the session key and join the trusted channel. Thus, the user establishes a trusted channel with the entire trusted computing cluster. In such process, the user does not need to negotiate and communicate with each trusted computing unit separately in a sequence, and does not need to pay attention to cluster details of the trusted computing cluster either. For the user, the process of establishing a trusted channel becomes very simple and clear.

BRIEF DESCRIPTION OF THE SEVERAL VIEWS OF THE DRAWINGS

To describe the technical solutions in the embodiments of this application more clearly, the following briefly describes the accompanying drawings for describing the embodiments. Clearly, the accompanying drawings in the following description show merely some embodiments of this application, and a person of ordinary skill in the art may still derive other drawings from these accompanying drawings without creative efforts.

DETAILED DESCRIPTION

Figure 1:
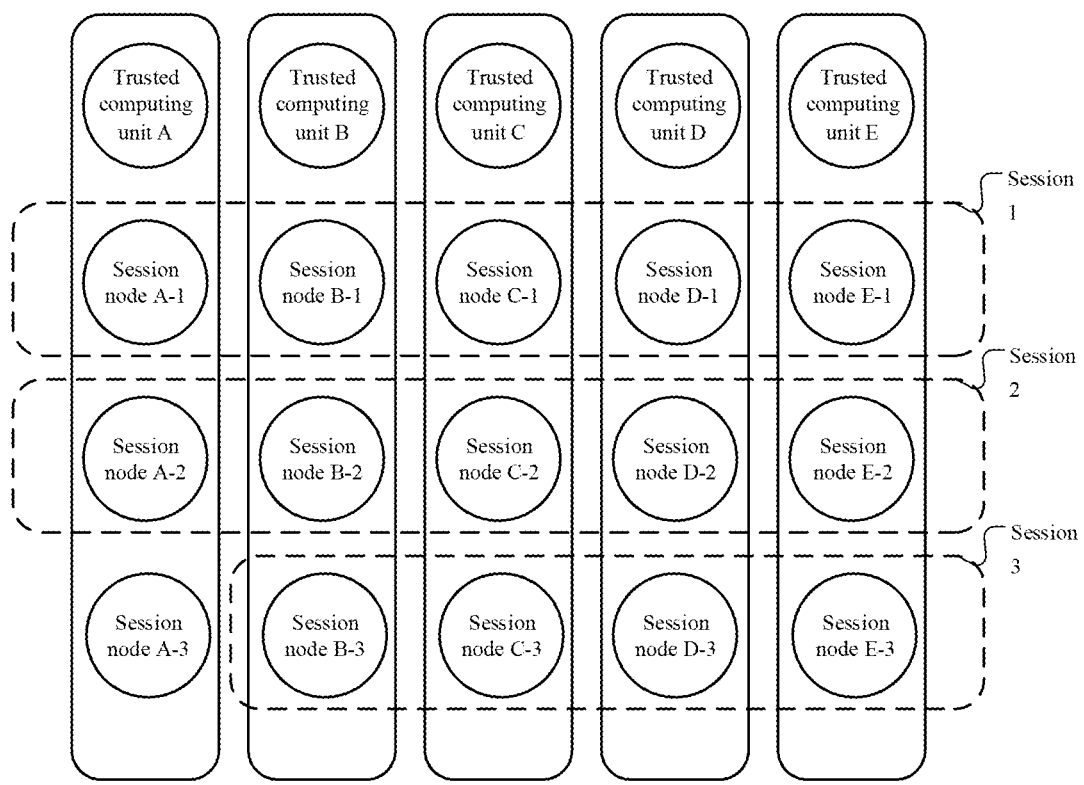
FIG. 1 is a schematic diagram of a relationship among a trusted computing unit, a session, and a session node according to some embodiments of the present specification.

The solutions provided in the present specification are described herein with reference to the accompanying drawings.

According to the solutions in some embodiments of the present specification, a trusted channel can be established between a user and a trusted computing cluster securely, quickly, and conveniently. The trusted computing cluster may be a pre-established cluster, which includes a plurality of trusted computing units. The trusted computing unit may be a computing module or computing device with a certain isolation capability to ensure computing security, for example, a trusted computing container enclave, which is, for example, implemented using technologies such as Software Guard Extension (SGX) or Trust Zone.

The plurality of trusted computing units can form a trusted computing cluster through mutual authentication of identities. In the process of establishing a trusted computing cluster, various trusted computing units maintain a same cluster key through key negotiation and other methods, which may form premise and basis for implementing some solutions in the present specification.

According to some embodiments in the present specification, a trusted channel is established and maintained between the user and the entire trusted cluster in a unified manner, so as to avoid the cumbersome establishment of separate channels between the user and various trusted computing units.

If a user establishes a trusted channel with the trusted computing cluster, it is assumed that the user has established a trusted relationship with the trusted computing cluster. For clarity of description, the concept of "session" is introduced to express such trusted relationship. In other words, in the present specification, a session can be considered as a trusted channel relationship established between a user and a trusted computing cluster.

One trusted computing cluster can establish a plurality of trusted relationships with a plurality of users, which is assumed that the trusted computing cluster can correspond to a plurality of trusted channels, that is, a plurality of sessions.

As described previously, to perform secure data transmission between the user and the trusted computing cluster, the two parties in communication negotiate and exchange an encrypted key, which is referred to as a session key in the present specification. The session key corresponds to the trusted channel and is used to encrypt and decrypt data transmitted through the trusted channel.

On the basis of the concept of session, in combination with the session key, the concept of session node can be derived, which is used to represent an entity corresponding to a trusted computing unit in a trusted computing cluster in each session. Since a trusted computing cluster can be involved in a plurality of sessions, each trusted computing unit can correspond to a plurality of session nodes.

From the perspective of sessions, one session can correspond to one or more session nodes. A criterion for determining whether a session node N has joined a certain session S is whether the session node N has a correct session key k corresponding to the session S. If the session node N has the correct session key k, it is considered that the session node N has joined the session S; if the session node N does not have the correct session key k, it is considered that the session node N has not yet joined the session S.

FIG. 1 is a schematic diagram of a relationship among a trusted computing unit, a session, and a session node according to some embodiments of the present specification. In FIG. 1, it is assumed that a certain trusted computing cluster includes five trusted computing units, which are denoted as A, B, C, D, and E, respectively. In addition, the trusted computing cluster has three sessions, which correspond to trusted channel 1, trusted channel 2, and trusted channel 3 established with users U1, U2, and U3, respectively.

In FIG. 1, the vertical direction shows a relationship between each trusted computing unit and the session nodes. For example, trusted computing unit A includes session nodes A-1, A-2, and A-3 corresponding to sessions 1, 2, and 3, respectively; trusted computing unit B includes session nodes B-1, B-2, and B-3 corresponding to sessions 1, 2, and 3, respectively.

In FIG. 1, the horizontal direction shows a relationship between each session and the session node. For example, session 1 includes session nodes A-1, B-1, C-1, D-1, and E-1 corresponding to computing units A, B, C, D, and E, respectively. However, whether these nodes join the corresponding sessions depends on whether these nodes have the correct session keys. For example, in FIG. 1, session node A-3 does not join session 3 because session node A-3 does not have the correct session key.

The foregoing describes the overall management architecture and concept for the trusted channel (or session) between the user and the trusted computing cluster. On the basis of such a management architecture, the trusted channel between the user and the trusted computing cluster can be established or re-established securely and quickly.

Figure 2:
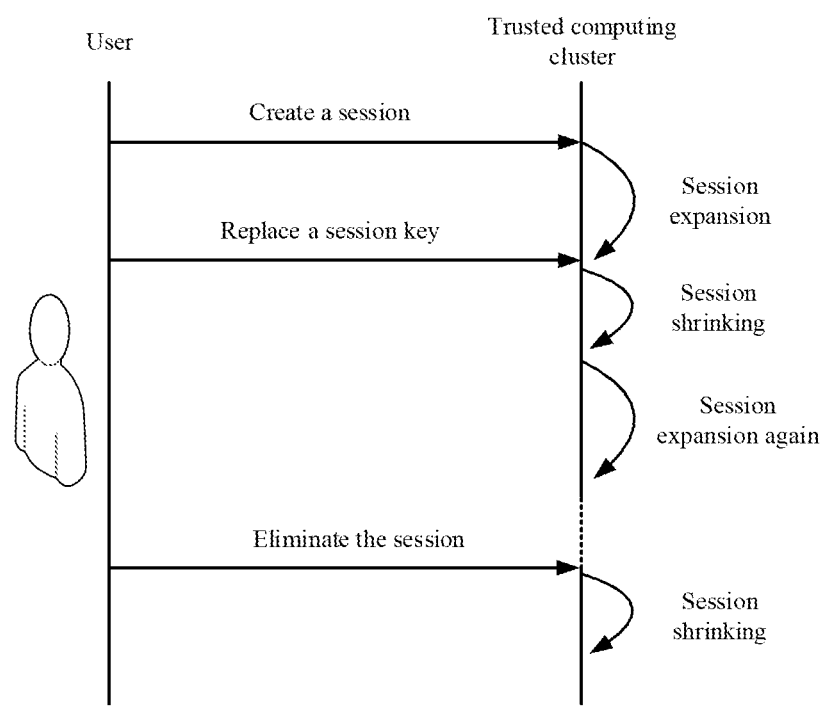
FIG. 2 shows an entire life cycle of a trusted channel according to some embodiments of the present specification.

FIG. 2 shows an entire life cycle of a trusted channel according to some embodiments of the present specification. As shown in FIG. 2, first, the user establishes a trusted channel with a certain trusted computing unit(s) (for example, trusted computing unit A) in the trusted computing cluster, that is, creates a session. Then, the session is expanded so that more corresponding session node(s) in the cluster (for example, the session nodes shown in FIG. 1) joins the session. This process may involve transmitting the corresponding session key throughout the trusted computing cluster. As such, each trusted computing unit in the trusted computing cluster obtains the session key, so each trusted computing unit joins the session, and the user establishes a trusted channel with the entire trusted computing cluster.

After the user uses the trusted channel to communicate with the trusted computing cluster for a period of time, under certain circumstances, the session key may need to be replaced. In such case, the session is shrunk to remove a session node(s) that does not have the latest session key, and then is expanded again to transmit the latest session key to the entire cluster again. Thus, the user re-establishes a trusted channel with the entire trusted computing cluster. This process can continue until the session is eliminated.

The following describes example processes of establishing a trusted channel through session expansion, and the process of re-establishing a trusted channel through session shrinking and session expansion.

Figure 3:
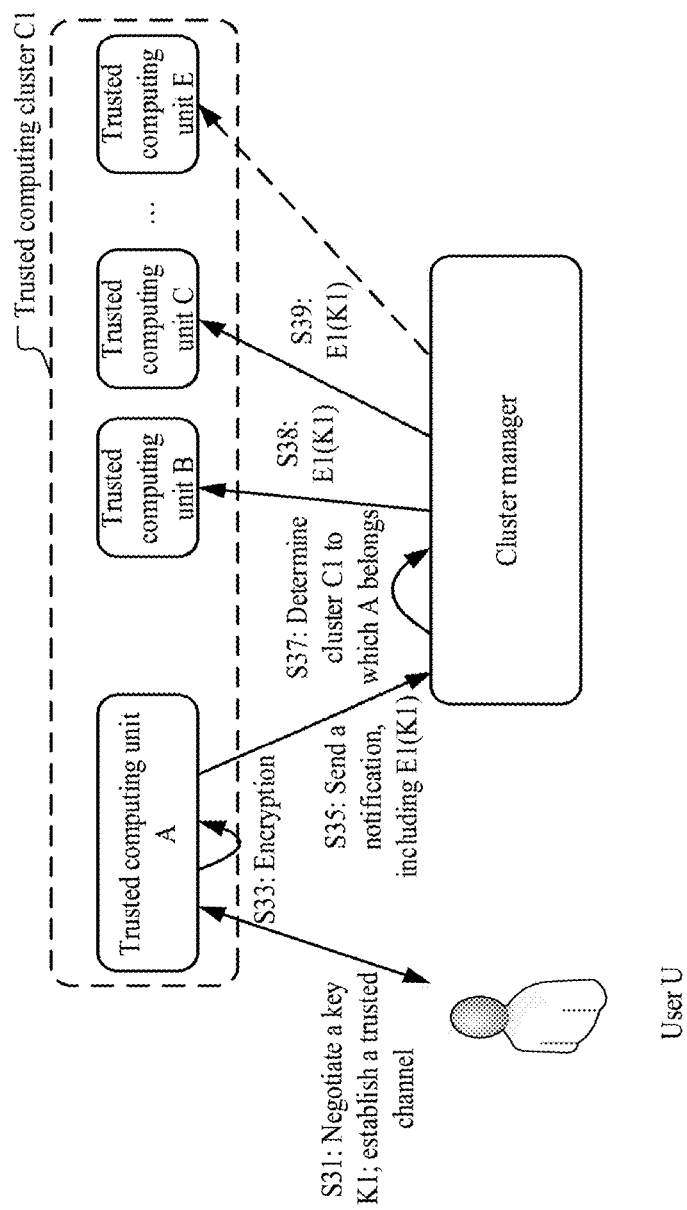
FIG. 3 is a schematic diagram of establishing a trusted channel between a user and a trusted computing cluster according to some embodiments.

FIG. 3 is a schematic diagram of establishing a trusted channel between a user and a trusted computing cluster according to some embodiments. For example, the example of FIG. 3 shows the process of establishing a trusted channel between user U and trusted computing cluster C1, where user U represents a computing device or terminal used by the user, and trusted computing cluster C1 is a pre-established trusted computing cluster that includes a plurality of trusted computing units. In the example of FIG. 3, the example of FIG. 1 is used, and it is assumed that trusted computing cluster C1 includes trusted computing units A, B, C, D, and E. However, it can be understood that in other examples, the trusted computing cluster may include any number of trusted computing units.

In some embodiments, the established trusted computing cluster is managed using a cluster manager. In some embodiments, the cluster manager maintains a cluster information table, which records information about each trusted computing unit included in each cluster. After a plurality of trusted computing units successfully form a trusted computing cluster, they register with the cluster manager and notify the cluster manager of the establishment of the trusted computing cluster. As such, the cluster manager maintains and updates the cluster information table based on received registration information. Table 1 shows an example of the cluster information table.

TABLE 1

| Cluster information table | |
| --- | --- |
| Cluster identifier | Computing unit |
| C1 | A, B, C, D, and E |
| C2 | G, H, I, M, N, and P |
| C3 | X, Y, and Z |
| ... | ... |

It is worthwhile to note that, in the process of constructing a trusted computing cluster, various trusted computing units mutually verify respective identities, perform security key negotiation, and ultimately maintain a same cluster key. This may be a basis for some implementations of this solution. Therefore, in the following description, when an established trusted computing cluster is referred to, it is assumed that each trusted computing unit in the trusted computing cluster maintains a cluster key specific to the cluster.

When user U wants to establish a trusted channel with trusted computing cluster C1, according to some embodiments of the present specification, user U can first establish a trusted channel with any one of the trusted computing units in cluster C1. For simplicity of description, a trusted computing unit that first establishes a trusted channel with the user is referred to as a first trusted computing unit. In an example, the first trusted computing unit is, for example, trusted computing unit A.

In step S31 of FIG. 3, trusted computing unit A obtains a session key K1 through negotiation with user U, and establishes a trusted channel with user U. For simplicity of description, such trusted channel is referred to as the first trusted channel herein. It can be understood that the session key K1 aims at or corresponds to the first trusted channel, and is used to encrypt and decrypt data transmitted through the first trusted channel. It should be understood that the descriptions of "first", "second", etc., in the present specification are merely intended to distinguish similar concepts for simplicity of description, and do not impose any limitation.

For example, trusted computing unit A and user U can perform key negotiation in a variety of ways to obtain the session key K1.

In an example, trusted computing unit A locally maintains an asymmetric public-private key pair (KA-Pub, KA-Pri), and user U also maintains its own asymmetric public-private key pair (KU-Pub, KU-Pri). To negotiate a same session key, trusted computing unit A and user U exchange their own public keys with each other. That is, trusted computing unit A sends the public key KA-Pub in its local public-private key pair to user U, and receives the user's public key KU-Pub from user U.

Then, trusted computing unit A can calculate the session key K1 based on the local public-private key pair (KA-Pub, KA-Pri) and the received public key KU-Pub of user U, and by using an encryption algorithm SE, that is, K1=SE(KA-Pub, KA-Pri, KU-Pub).

According to some implementations, user U calculates a session key K1' based on the public-private key pair (KU-Pub, KU-Pri) of user U and received public key KA-Pub of trusted computing unit A, and by using the encryption algorithm, that is, K1'=SE(KU-Pub, KU-Pri, KA-Pub).

The encryption algorithm SE can be designed such that SE(KA-Pub, KA-Pri, KU-Pub)=SE(KU-Pub, KU-Pri, KA-Pub). Thus, trusted computing unit A exchanges its calculated K1 with K1' calculated by user U, and completes the key negotiation in response to that K1 is equal to K1'.

As such, trusted computing unit A and user U obtain the same session key K1, thereby achieving the key negotiation.

In other embodiments, other key negotiation methods that are known in the art or will be adopted in the future can be used. For example, the two parties in communication exchange some device information, and generate a session key based on the device information of the two parties and an agreed algorithm; or it is agreed that one party generates a session key in some way, and then notifies the other party of the session key, and so on.

After trusted computing unit A negotiates with user U to obtain the first session key K1, in step S33, trusted computing unit A uses a cluster key of trusted computing cluster C1 to which trusted computing unit A belongs, hereinafter referred to as a first cluster secret, to encrypt the first session key K1 to obtain an encrypted key E1(K1). As described previously, in a trusted computing cluster that has been constructed, each trusted computing unit maintains a cluster key specific to the cluster. Each of the trusted computing units A-E in the trusted computing cluster C1 maintains the cluster key E1. Therefore, trusted computing unit A can calculate the encrypted key E1(K1) based on the cluster key E1 maintained by trusted computing unit A and by using an encryption algorithm.

After that, in step S35, trusted computing unit A sends a notification to the cluster manager, hereinafter referred to as a first notification, which includes the encrypted key E1(K1) obtained through encryption using the cluster key E1.

After the cluster manager receives the notification from trusted computing unit A, in step S37, the cluster manager first determines information about the trusted computing cluster to which trusted computing unit A belongs. As described previously, when each trusted computing cluster is established, the trusted computing cluster registers with the cluster manager, so the cluster manager maintains information about each trusted computing cluster. For example, the cluster information is maintained using the cluster information table in Table 1.

In step S37, the cluster manager can determine, by querying the maintained cluster information table, the trusted computing cluster to which trusted computing unit A belongs, which is referred to as a first trusted computing cluster, and can further determine other trusted computing units included in the first trusted computing cluster.

For example, by querying the cluster information table in Table 1, the cluster manager can determine that trusted computing unit A belongs to trusted computing cluster C1, and trusted computing cluster further includes trusted computing units B, C, D, and E.

Thus, in step S38, the cluster manager transfers the encrypted key E1(K1) in the first notification received in step S35 to other trusted computing units in the first trusted computing cluster. In such case, any one of the other trusted computing units is referred to as a second trusted computing unit. For example, the cluster manager transfers the encrypted key E1(K1) to trusted computing unit B.

As described previously, the first trusted computing cluster C1 includes a plurality of trusted computing units each maintaining a same cluster key E1. Therefore, after receiving the encrypted key E1(K1), the second trusted computing unit (for example, trusted computing unit B) can decrypt the encrypted key E1(K1) using the cluster key E1 maintained by the second trusted computing unit, to obtain the session key K1. With the correct session key K1, the second trusted computing unit can join the first trusted channel for communicating with user U.

It can be understood that after step S38, or in parallel with step S38, the cluster manager can transfer the encrypted key E1(K1) to various trusted computing units in the first trusted computing cluster (C1) one by one. For example, in step S39, the cluster manager further transfers the encrypted key E1(K1) to a third trusted computing unit such as trusted computing unit C, so trusted computing unit C also joins the first trusted channel; similarly, trusted computing units D and E can also join the first trusted channel after receiving the E1(K1) transferred by the cluster manager, and then decrypting the E1(K1) to obtain K1.

In some embodiments, the cluster manager can transfer the encrypted key to all trusted computing units in the first trusted computing cluster, so that each trusted computing unit joins the first trusted channel. In other embodiments, the cluster manager can alternatively transfer the encrypted key to some trusted computing units in the first trusted computing cluster according to a determined rule, predetermined or dynamically determined, or based on needs. For example, if a certain trusted computing unit fails, or processing performance of a trusted computing unit is severely degraded, or a processing capability of a trusted computing unit is insufficient, the cluster manager can avoid transferring the encrypted key to such a trusted computing unit. The processing status of a trusted computing unit can be periodically reported by the trusted computing unit to the cluster manager, or can be uniformly evaluated and managed by the cluster manager.

It can be determined from the process that, when user U wants to establish a trusted channel with trusted computing cluster C1, user U only negotiates with any one of the trusted computing units (for example, trusted computing unit A) in cluster C1 to obtain the session key K1, so as to establish the first trusted channel. Then, the cluster manager transmits the encrypted session key E1(K1) in the trusted computing cluster C1, so that other trusted computing units in the cluster obtain the session key and join the first trusted channel. Thus, it can be considered that user U has established the first trusted channel with the entire trusted computing cluster. In such process, user U does not need to negotiate and communicate with each trusted computing unit separately in a sequence, and does not need to pay attention to cluster details of trusted computing cluster C1 either. For the user, the process of establishing a trusted channel becomes very simple and clear.

In addition, the cluster manager transmits the encrypted key E1(K1) obtained through encryption using the cluster key E1, and the cluster key E1 is only held and maintained by the members of the corresponding trusted computing cluster. Even if the encrypted key E1(K1) is obtained by another computing device during the transmission, the computing device still cannot decrypt the session key K1 because it does not have the corresponding cluster key E1, and thus cannot join the session of the first trusted channel. As such, the security of the establishment of a trusted channel is ensured.

Further, in some embodiments, the cluster manager not only maintains the information about the established cluster, but also manages and maintains the status of each trusted channel in the form of a session, that is, maintains the status of each session. The following describes the management of the session corresponding to the first trusted channel by the cluster manager in the process of establishing the first trusted channel.

In some implementations, after trusted computing unit A and user U successfully establish the first trusted channel, trusted computing unit A sends a message to the cluster manager to notify the cluster manager that a new trusted channel has been established, and requests to allocate a session identifier to the trusted channel.

Thus, after step S31 and before step S35, the cluster manager allocates a session identifier to the first trusted channel, which is referred to as a first session identifier here. In an example, the session identifier can be presented in the form of a session ID, for example, denoted as SID1.

In some embodiments, after allocating the first session identifier, the cluster manager further establishes a corresponding trusted computing unit list for the newly created first session identifier, which is referred to as a first trusted computing unit list here, and is used to record the trusted computing unit that joins the corresponding session.

The request message for the first trusted channel comes from first trusted computing unit A, indicating that the first trusted channel was created by trusted computing unit A, and trusted computing unit A has already joined the session. Therefore, in an example, when creating the first trusted computing unit list, the cluster manager adds a unit identifier of first trusted computing unit A to the first trusted computing unit list.

Then, the cluster manager returns the first session identifier to trusted computing unit A. Thus, in some embodiments, trusted computing unit A includes the first session identifier SID1 obtained above in the first notification. In such case, the first notification includes the encrypted key E1(K1) for the first trusted channel and the session identifier SID1 corresponding to the first trusted channel, and the two are correspondingly associated with each other.

In another example, after receiving the first notification, and determining that first trusted computing unit A has obtained the session key for the first trusted channel, the cluster manager adds the unit identifier of first trusted computing unit A to the first trusted computing unit list corresponding to the first session identifier.

For example, in such case, the first trusted computing unit list can be expressed as follows: SID1:<A>.

Next, in step S38, the cluster manager transfers the encrypted key E1(K1) to the second trusted computing unit, for example, trusted computing unit B. In some embodiments, the cluster manager further transfers the first session identifier SID1 to the second trusted computing unit, so that the second trusted computing unit knows the session identifier of the trusted channel that the second trusted computing unit has joined. In addition, the cluster manager further adds the unit identifier corresponding to the second trusted computing unit to the first trusted computing unit list corresponding to the first session identifier. In such case, the first trusted computing unit list can be expressed as follows: SID1:<A,B>.

After subsequently transferring the encrypted key E1(K1) to trusted computing units C, D, and E, the cluster manager similarly adds the unit identifiers of these trusted computing units to the first trusted computing unit list. In such case, the list can be expressed as follows: SID1:<A,B,C,D,E>.

As such, the status of the session corresponding to the first trusted channel is recorded and managed using the session identifier and the corresponding trusted computing unit list.

It can be understood that, similar to the first session corresponding to the first trusted channel, the cluster manager records and manages the status of each session corresponding to each trusted channel. In an example, the cluster manager records the status of each session using a session status table, and the session status table records a trusted computing unit list corresponding to each session identifier. Table 2 shows the session status table in an example.

TABLE 2

Session status table

| Session identifier | Trusted computing unit list |
|---|---|
| SID1 | A, B, C, D, and E |
| SID2 | A, B, C, and D |
| SID3 | G, H, I, M, N, and P |
| . . . | . . . |

As such, the session status can be continuously managed when the session is subsequently shrunk and expanded again. The following describes the process of re-establishing a trusted channel between the user and the trusted computing cluster through the shrinking and expansion of the session.

As described above, the user can establish a trusted channel with any one of the trusted computing units in the trusted computing cluster, so as to establish a trusted channel with, e.g., the entire trusted computing cluster, and then perform data communication with the trusted computing cluster through the trusted channel. In practice, for security reasons, when certain conditions are satisfied, for example, a determined key update time interval, predetermined or dynamically determined, is satisfied, or the trusted channel has been used to transmit a determined amount of data, predetermined or dynamically determined, and so on, the user replaces the session key with the trusted computing cluster. This process is referred to as the re-establishment of the trusted channel.

It is assumed that the user has established a trusted channel with a certain trusted computing cluster. For simplicity of description, a certain trusted computing cluster here is referred to as a second trusted computing cluster, and the established trusted channel is referred to as a second trusted channel. It can be understood that the second trusted computing cluster here and the first trusted computing cluster (for example, cluster C1) may be the same cluster or different clusters. Correspondingly, the second trusted channel and the first trusted channel may be the same or different.

According to one or more implementations of the present specification, when the user wants to replace the session key for the second trusted channel, the user only updates the session key using any one of the trusted computing units in the second trusted computing cluster. For simplicity of description, any one trusted computing unit is referred to as a fourth trusted computing unit.

Figure 4:
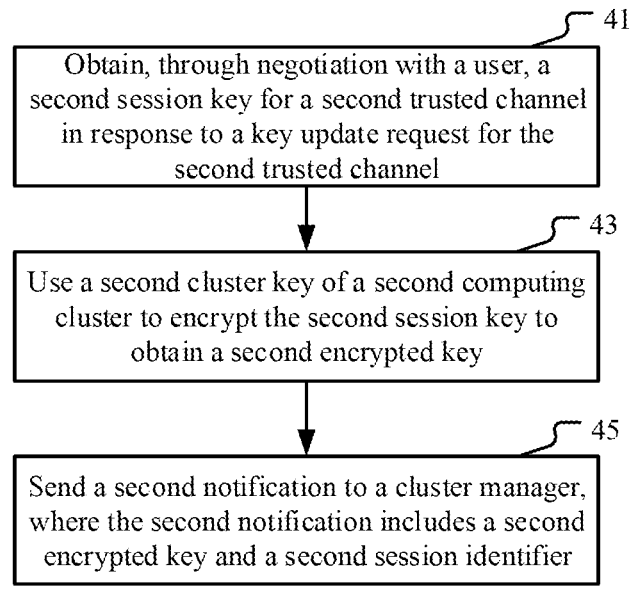
FIG. 4 is a flowchart of re-establishing a trusted channel between a user and a trusted computing cluster according to some embodiments.

FIG. 4 is a flowchart of re-establishing a trusted channel between a user and a trusted computing cluster according to some embodiments. The method is performed by the fourth trusted computing unit. The fourth trusted computing unit belongs to a pre-established second trusted computing cluster, and the second trusted computing cluster has established a second trusted channel with the user.

The following provides a description with reference to an example. It is assumed that the second trusted computing cluster is cluster C2 shown in Table 1, and the cluster includes trusted computing units G, H, I, M, N, and P. The information about the second trusted computing cluster has been pre-registered in the cluster manager. In addition, the user has established a trusted channel with trusted computing cluster C2 in a method similar to FIG. 3, and the trusted channel is referred to as the second trusted channel in these embodiments. It can be understood that, in the process of establishing the second trusted channel, the cluster manager allocates a second session identifier, such as SID3, to the second trusted channel, and records a trusted computing unit list corresponding to the second session identifier using the session status table in Table 2, for example. In addition, the cluster manager further returns the second session identifier to each trusted computing unit joining the session. Therefore, trusted computing units G, H, I, M, N, and P all obtain the second session identifier corresponding to the second trusted channel.

Now it is assumed that the user updates the session key using any one of the trusted computing units H. The fourth trusted computing unit H executes the following process.

In step 41, the fourth trusted computing unit H obtains, through negotiation with the user, a second session key for the second trusted channel in response to a key update request for the second trusted channel, where the second session key is used to replace an original key of the second trusted channel to encrypt transmitted data.

In some embodiments, the key update request is initiated by the user. For example, the user can send the key update request based on his/her own needs.

In other embodiments, the key update request can alternatively be initiated by the cluster manager according to a determined management rule, predetermined or dynamically determined. For example, a management rule may stipulate that each trusted channel updates the session key every determined time interval.

In response to a key update request for the second trusted channel, the fourth trusted computing unit such as trusted computing unit H obtains, through negotiation with the user, a new session key for the trusted channel, which is referred to as a second session key here and is denoted as K2. The processes for key negotiation of the second session key are similar as those in the process for establishing a trusted channel, and details are omitted here for simplicity. It can be understood that, the second session key is used to replace an original key of the second trusted channel to encrypt transmitted data.

Next, in step 43, the fourth trusted computing unit uses the cluster key of the second computing cluster to which the fourth trusted computing unit belongs, that is, the second cluster key, to encrypt the second session key to obtain the second encrypted key.

For example, when the fourth trusted computing unit is trusted, e.g., computing unit H, since trusted computing unit H belongs to the second computing cluster C2, trusted computing unit H maintains the second cluster key E2 specific to C2. Thus, the second cluster key E2 can be used to encrypt the second session key K2 to obtain the second encrypted key E2(K2).

In addition, as described above, when pre-establishing or joining the second trusted channel, fourth trusted computing unit H obtains the second session identifier corresponding to the second trusted channel from the cluster manager, such as SID3. Therefore, in step 45, the fourth trusted computing unit can send a second notification to the cluster manager, where the second notification includes the second encrypted key E2(K2) and the second session identifier, so that the cluster manager transfers the second encrypted key to other trusted computing units related to the second session identifier.

Next, the process of shrinking and expanding the session of the second trusted channel is executed by the cluster manager.

Figure 5:
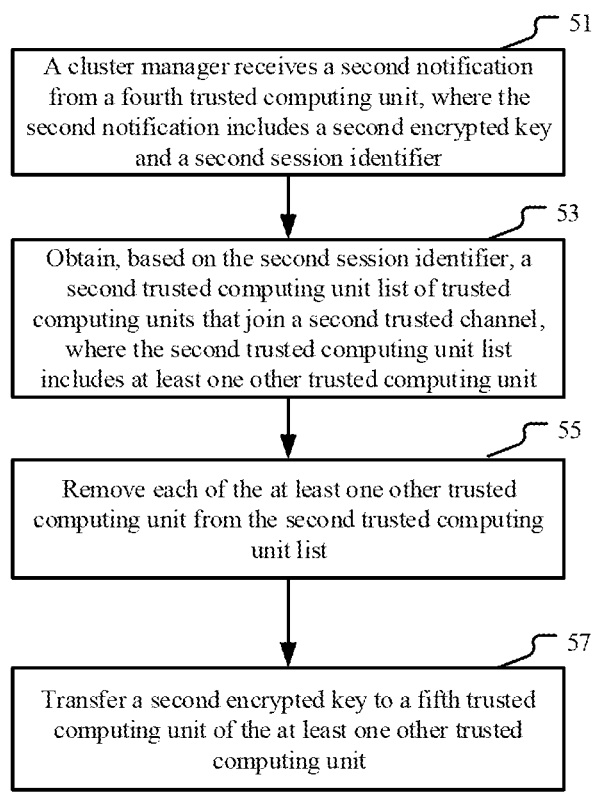
FIG. 5 is a flowchart of re-establishing a trusted channel between a user and a trusted computing cluster according to some embodiments.

FIG. 5 is a flowchart of re-establishing a trusted channel between a user and a trusted computing cluster according to some embodiments. The method is performed by a cluster manager.

As shown in FIG. 5, in step 51, the cluster manager receives a second notification from a fourth trusted computing unit, where the second notification includes a second encrypted key and a second session identifier. The second session identifier corresponds to a second trusted channel between the fourth trusted computing unit and the user, and the second encrypted key is obtained by encrypting the updated second session key using the second cluster key. For example, corresponding to step 45 in FIG. 4, the cluster manager receives the second notification from trusted computing unit H, where the second notification includes the second encrypted key E2(K2) and the second session identifier SID3.

Next, in step 53, the cluster manager obtains, based on the second session identifier, a second trusted computing unit list of trusted computing units that join the second trusted channel, where the second trusted computing unit list includes the fourth trusted computing unit and at least one other trusted computing unit belonging to the second trusted computing cluster.

As described above, the cluster manager is configured to manage each pre-established trusted computing cluster, for example, record the trusted computing cluster as the cluster information table shown in Table 1. In addition, the cluster manager further maintains the status of each session established with each trusted computing cluster. In some embodiments, the cluster manager records and maintains the status of each session established with each trusted computing cluster using the session status table in Table 2.

Through the session status table, the cluster manager can query and obtain a second trusted computing unit list corresponding to the second session identifier, where the second trusted computing unit list records the trusted computing unit that joins the second trusted channel. Referring to the process of FIG. 3, it can be understood that the units that join the second trusted channel together with the fourth trusted computing unit must belong to the second trusted computing cluster. Therefore, the second trusted computing unit list includes the fourth trusted computing unit and at least one other trusted computing unit that also belongs to the second trusted computing cluster.

For example, for the second session identifier SID3 included in the second notification, the cluster manager can determine, for example, by querying the session status table in Table 2, that the second trusted computing unit list corresponding to the second session identifier SID3 includes: SID3: <G,H,I,M,N,P>.

The second trusted computing unit list includes fourth trusted computing unit H and other trusted computing units G, I, M, N, and P that also belong to the second trusted computing cluster C2.

Next, in step 55, the cluster manager removes each of the at least one other trusted computing units from the second trusted computing unit list. In other words, because currently only the fourth trusted computing unit has obtained the updated session key, it is considered that only the fourth trusted computing unit remains in the session corresponding to the second trusted channel, and other trusted computing units were removed from the session because the key was not updated. Therefore, these trusted computing units are removed from the second trusted computing unit list.

The example is still used for description. After the second trusted computing unit list <G,H,I,M,N,P> corresponding to the second session identifier SID3 is determined in step 53, in step 55, all units other than fourth trusted computing unit H are removed from the list. In such case, the second trusted computing unit list is updated to: SID3: <H>.

After that, in step 57, the cluster manager transfers the second encrypted key to a fifth trusted computing unit of the at least one other trusted computing units, so that the fifth trusted computing unit decrypts the second encrypted key based on the second cluster key maintained by the fifth trusted computing unit to obtain the second session key, and thus rejoins the second trusted channel based on the second session key.

It is worthwhile to note that, the fifth trusted computing unit is any one of the trusted computing units that previously joined the second trusted channel other than the fourth trusted computing unit. Therefore, the fifth trusted computing unit must belong to the same second trusted cluster as the fourth trusted computing unit, and therefore also maintains the second cluster key. As such, after receiving the second encrypted key, the fifth trusted computing unit can decrypt the second encrypted key using the second cluster key, to obtain the second session key, which is a new session key of the second trusted channel. Thus, the fifth trusted computing unit can rejoin the second trusted channel.

In some embodiments, after the transferring the second encrypted key to the fifth trusted computing unit, the cluster manager adds the unit identifier of the fifth trusted computing unit to the second trusted computing unit list again to indicate that the fifth trusted computing unit rejoins the second session.

In the same way, the cluster manager can transfer the second encrypted key to the trusted computing units previously joined the second trusted channel one by one, so that these trusted computing units rejoin the second trusted channel. Further, the cluster manager can add the unit identifiers of these trusted computing units to the second trusted computing unit list.

The example is used for description. In step 55, all units other than fourth trusted computing unit H are removed from the second trusted computing unit list. That is, the removed units include G, I, M, N, and P. In step 57, the second encrypted key E2(K2) is transferred to the fifth trusted computing unit in the removed units, for example, trusted computing unit G. Thus, trusted computing unit G can decrypt E2(K2) using the second cluster key E2 maintained by trusted computing unit G to obtain the updated session key K2 for the second trusted channel, thereby rejoining the second trusted channel.

In addition, the cluster manager adds the unit identifier of trusted computing unit G back to the second trusted computing unit list. In such case, the second trusted computing unit list is updated to: SID3: <G,H>.

After that, the cluster manager further transfers the second encrypted key E2(K2) to trusted computing units I, M, N, and P, so that these trusted computing units rejoin the second trusted channel. After that, the second trusted computing unit list is updated again to: SID3: <G,H,I,M,N,P>.

In the process, when all units other than the fourth trusted computing unit are removed from the second trusted computing unit list, the second session corresponding to the second channel is shrunk to the minimum and includes only the fourth trusted computing unit. After that, as the second encrypted key is transmitted again, the second session is expanded again. For example, at the shrinking stage, the nodes included in the session SID3 are shrunk to <H>, and then are expanded to <G,H,I,M,N,P> again. Through the process of shrinking the session and then expanding the session again, the process of re-establishing the trusted channel between the user and the trusted computing cluster is implemented.

In the process, when user U replaces the session key of the second trusted channel that has been established, user U only negotiates with any one of the trusted computing units in the cluster to obtain a new session key K2, and the cluster manager removes the trusted computing units that previously joined the second trusted channel out of the corresponding second session, and then transmits the encrypted session key E2(K2) again in the cluster, so that these trusted computing units rejoin the second session. In the entire process, the user does not need to negotiate and communicate with each trusted computing unit separately in a sequence, and does not need to pay attention to cluster details of the trusted computing cluster either. The re-establishment process is simple and secure.

Figure 6:
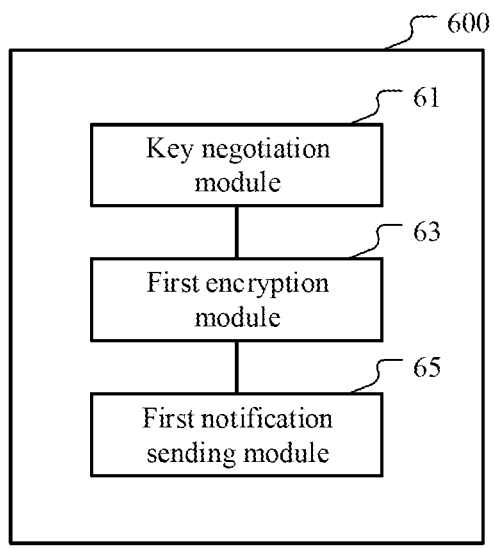
FIG. 6 is a schematic block diagram illustrating an apparatus for establishing a trusted channel according to some embodiments.

According to some embodiments in another aspect, an apparatus for establishing a trusted channel between a user and a trusted computing cluster is further provided. FIG. 6 is a schematic block diagram illustrating an apparatus for establishing a trusted channel according to some embodiments. The establishment apparatus is deployed in the trusted computing unit. In the following description, the trusted computing unit is referred to as the first trusted computing unit. The first trusted computing unit belongs to a pre-established first trusted computing cluster, the first trusted computing cluster includes a plurality of trusted computing units each maintaining a same first cluster key, and the first trusted computing unit pre-registers with a cluster manager for information about the first trusted computing cluster to which the first trusted computing unit belongs. As shown in FIG. 6, the establishment apparatus 600 includes: a key negotiation module 61, configured to obtain a first session key through negotiation with a user, and establish a first trusted channel with the user, where the first session key is used to encrypt data to be transmitted through the first trusted channel; a first encryption module 63, configured to encrypt the first session key using the first cluster key to obtain a first encrypted key; and a first notification sending module 65, configured to send a first notification to the cluster manager, where the first notification includes the first encrypted key, so that the cluster manager transfers the first encrypted key to other trusted computing units in the first trusted computing cluster.

According to some embodiments, the key negotiation module 61 is configured to: send a first public key of a first key pair of the first trusted computing unit to the user, the first key pair including the first public key and a first private key, and obtain a user public key provided by the user; and generate the first session key based on the first public key, the first private key, and the user public key.

In some embodiments, the apparatus 600 further includes an identifier acquisition module (not shown), configured to perform the following steps before the first notification sending module 65 sends a first notification to the cluster manager: sending an identifier request message for the first trusted channel to the cluster manager; obtaining a first session identifier allocated by the cluster manager to the first trusted channel; and including the first session identifier into the first notification.

Figure 7:
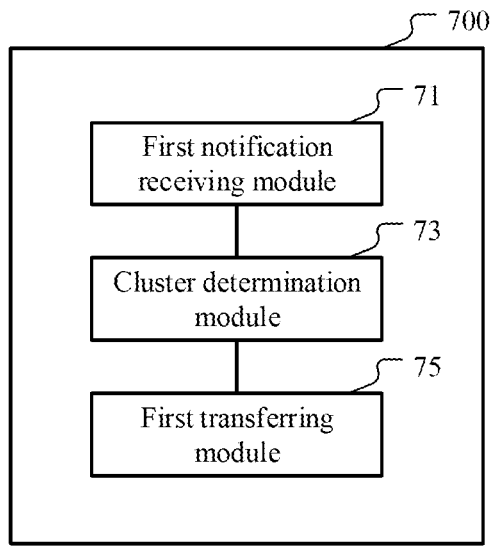
FIG. 7 is a schematic block diagram illustrating an apparatus for establishing a trusted channel according to some embodiments.

According to some embodiments in still another aspect, an apparatus for establishing a trusted channel between a user and a trusted computing cluster is further provided. FIG. 7 is a schematic block diagram illustrating an apparatus for establishing a trusted channel according to some embodiments. The establishment apparatus is deployed in the cluster manager. The cluster manager is configured to manage at least one pre-established trusted computing cluster. As shown in FIG. 7, the establishment apparatus 700 includes: a first notification receiving module 71, configured to receive a first notification from a first trusted computing unit, where the first notification includes a first encrypted key, the first encrypted key is obtained by encrypting a first session key using a first cluster key, and the first session key is a data encryption key corresponding to a first trusted channel between the first trusted computing unit and the user; a cluster determination module 73, configured to determine a first trusted computing cluster to which the first trusted computing unit belongs, where each trusted computing unit in the first trusted computing cluster maintains the first cluster key; and a first transferring module 75, configured to transfer the first encrypted key to a second trusted computing unit in the first trusted computing cluster, so that the second trusted computing unit decrypts the first encrypted key based on the first cluster key maintained by the second trusted computing unit to obtain the first session key, and thus joins the first trusted channel based on the first session key.

According to some embodiments, the establishment apparatus 700 further includes (not shown): a session identifier allocation module, configured to allocate a first session identifier to the first trusted channel in response to an identifier request message of the first trusted computing unit for the first trusted channel; and a first list adding module, configured to add the first trusted computing unit to a first trusted computing unit list corresponding to the first session identifier.

Further, in some embodiments, the first notification further includes the first session identifier, and the first transferring module 75 is further configured to transfer the first session identifier to the second trusted computing unit; and the first list adding module is further configured to add the second trusted computing unit to the first trusted computing unit list.

According to some implementations, the cluster determination module 73 is configured to use a maintained cluster information table to determine a first trusted computing cluster to which the first trusted computing unit belongs, and each trusted computing unit included in the first trusted computing cluster.

In some embodiments, the first transferring module 75 is further configured to: transfer the first encrypted key to a third trusted computing unit in the first trusted computing cluster, so that the third trusted computing unit decrypts the first encrypted key based on the first cluster key maintained by the third trusted computing unit to obtain the first session key, and thus joins the first trusted channel based on the first session key.

Figure 8:
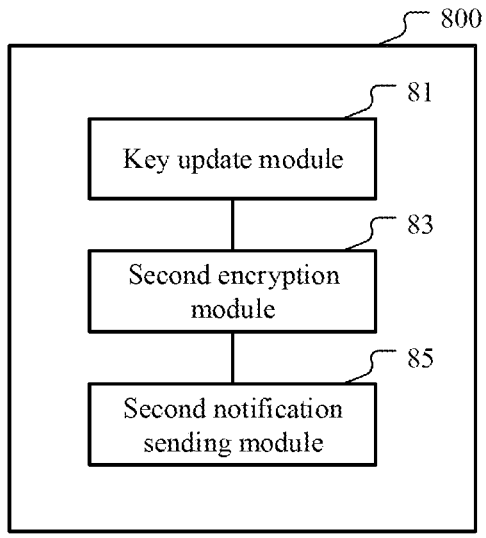
FIG. 8 is a schematic block diagram illustrating an apparatus for re-establishing a trusted channel according to some embodiments.

According to some embodiments in another aspect, an apparatus for re-establishing a trusted channel between a user and a trusted computing cluster is further provided. FIG. 8 is a schematic block diagram illustrating an apparatus for re-establishing a trusted channel according to some embodiments. The re-establishment apparatus is deployed in the trusted computing unit. In the following description, the trusted computing unit is referred to as the fourth trusted computing unit. The fourth trusted computing unit has established a second trusted channel with the user, the fourth trusted computing unit belongs to a pre-established second trusted computing cluster, the second trusted computing cluster includes a plurality of trusted computing units each maintaining a same second cluster key, the fourth trusted computing unit pre-registers with a cluster manager for information about the second trusted computing cluster to which the fourth trusted computing unit belongs, and the fourth trusted computing unit obtains a second session identifier corresponding to the second trusted channel from the cluster manager. Under the premise, the re-establishment apparatus 800 includes: a key update module 81, configured to obtain, through negotiation with the user, a second session key for the second trusted channel in response to a key update request for the second trusted channel, where the second session key is used to replace an original key of the second trusted channel to encrypt transmitted data; a second encryption module 83, configured to encrypt the second session key using the second cluster key to obtain a second encrypted key; and a second notification sending module 85, configured to send a second notification to the cluster manager, where the second notification includes the second encrypted key and the second session identifier, so that the cluster manager transfers the second encrypted key to other trusted computing units related to the second session identifier.

Figure 9:
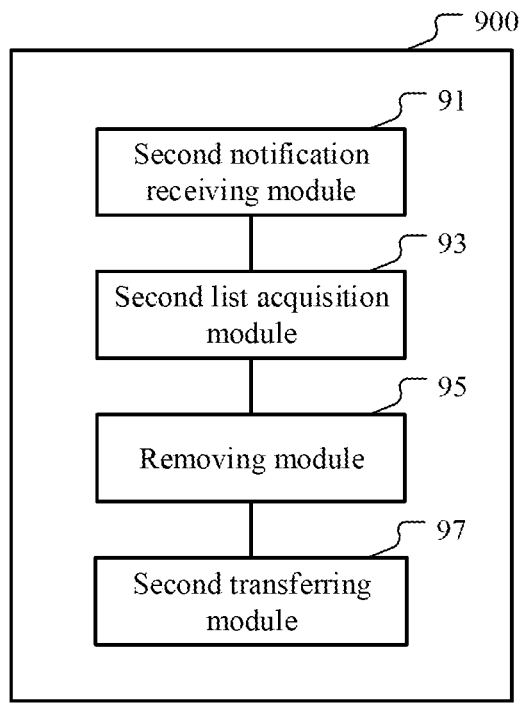
FIG. 9 is a schematic block diagram illustrating an apparatus for re-establishing a trusted channel according to some embodiments.

According to some embodiments in still another aspect, an apparatus for re-establishing a trusted channel between a user and a trusted computing cluster is further provided. FIG. 9 is a schematic block diagram illustrating an apparatus for re-establishing a trusted channel according to some embodiments. The re-establishment apparatus is deployed in the cluster manager. The cluster manager is configured to manage at least one pre-established trusted computing cluster. As shown in FIG. 9, the re-establishment apparatus 900 includes: a second notification receiving module 91, configured to receive a second notification from a fourth trusted computing unit, where the fourth trusted computing unit belongs to a pre-established second trusted computing cluster, the second trusted computing cluster includes a plurality of trusted computing units each maintaining a same second cluster key, the second notification includes a second session identifier and a second encrypted key, the second session identifier corresponds to a second trusted channel that has been established between the fourth trusted computing unit and the user, the second encrypted key is obtained by encrypting a second session key using the second cluster key, and the second session key is an updated key for the second trusted channel; a second list acquisition module 93, configured to obtain, based on the second session identifier, a second trusted computing unit list of trusted computing units that join the second trusted channel, where the second trusted computing unit list includes the fourth trusted computing unit and at least one other trusted computing unit belonging to the second trusted computing cluster; a removing module 95, configured to remove each of the at least one other trusted computing units from the second trusted computing unit list; and a second transferring module 97, configured to transfer the second encrypted key to a fifth trusted computing unit of the at least one other trusted computing units, so that the fifth trusted computing unit decrypts the second encrypted key based on the second cluster key maintained by the fifth trusted computing unit to obtain the second session key, and thus rejoins the second trusted channel based on the second session key.

In some embodiments, the re-establishment apparatus 900 further includes a second list adding module (not shown), configured to: after the second transferring module 97 transfers the second encrypted key to a fifth trusted computing unit of the at least one other trusted computing units, add the fifth trusted computing unit to the second trusted computing unit list.

According to some embodiments in another aspect, a computer-readable storage medium is further provided, where the computer-readable storage medium stores a computer program, and when the computer program is executed in a computer, the computer is enabled to perform the methods described with reference to FIG. 3 to FIG. 5.

According to some embodiments in yet another aspect, a computing device is further provided, including a memory and a processor, where the memory stores executable code, and the processor executes the executable code to implement the methods described with reference to FIG. 3 to FIG. 5.

A person skilled in the art should be aware that, in the one or more examples, functions described in the present application can be implemented by hardware, software, firmware, or any combination thereof. When being implemented by software, these functions can be stored in a computer-readable medium or transmitted as one or more instructions or code in the computer-readable medium.

The objectives, technical solutions, and beneficial effects of the present application are further described in detail in the implementations. It should be understood that the descriptions are merely implementations of the present application, but are not intended to limit the protection scope of the present application. Any modification, equivalent replacement, or improvement made based on the technical solutions of the present application shall fall within the protection scope of the present application.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for establishing a trusted channel between a user and a trusted computing cluster, the trusted computing cluster including a plurality of trusted computing units each maintaining a first cluster key, the method comprising:
obtaining, by a first trusted computing unit of the trusted computing cluster, a first session key through negotiation with a user, and establishing a first trusted channel with the user, the first session key configured to encrypt data to be transmitted through the first trusted channel;
encrypting, by the first trusted computing unit, the first session key using the first cluster key to obtain a first encrypted key; and
causing the first encrypted key to be sent to a second trusted computing unit in of the trusted computing cluster.

2. The method according to claim 1, wherein the obtaining the first session key through negotiation with the user includes:
sending a first public key of a first key pair of the first trusted computing unit to the user, the first key pair including the first public key and a first private key, and obtaining a user public key provided by the user; and
generating the first session key based on the first public key, the first private key, and the user public key.

3. The method according to claim 1, comprising:
before the causing the first encrypted key to be sent to the second trusted computing unit:
sending an identifier request message for the first trusted channel to a cluster manager;
obtaining, from the cluster manager, a first session identifier allocated to the first trusted channel; and
causing the first session identifier to be sent together with the first encrypted key to the second trusted computing unit.

4. A method, comprising:
receiving, from a first trusted computing unit, an encrypted key, the encrypted key corresponding to a trusted channel between the first trusted computing unit and a user outside a trusted computing environment of the first trusted computing unit;

determining a trusted computing cluster to which the first trusted computing unit belongs; and sending the encrypted key to a second trusted computing unit of the trusted computing cluster, enabling the second trusted computing unit to decrypt the encrypted key using a cluster key of the trusted computing cluster to obtain a session key for the trusted channel and to join the trusted channel based on the session key.

5. The method of claim 4, comprising:

receiving from the first trusted computing unit, a session identifier corresponding to the trusted channel; and obtaining, based on the session identifier, a list of trusted computing units of the trusted computing cluster that join the trusted channel, the list including the first trusted computing unit.

6. The method of claim 5, comprising:

before the sending the encrypted key to the second trusted computing unit of the trusted computing cluster, removing all trusted computing units from the list except for the first trusted computing unit.

7. The method according to claim 4, further comprising:

receiving, from the first trusted computing unit, a request for an identifier with respect to the trusted channel;

allocating a session identifier to the trusted channel in response to the request; and adding the first trusted computing unit to a list of trusted computing unit of the trusted computing cluster corresponding to the session identifier.

8. The method according to claim 7, comprising:

sending the session identifier to the second trusted computing unit; and adding the second trusted computing unit to the list of trusted computing units.

9. The method according to claim 4, wherein the determining the trusted computing cluster to which the first trusted computing unit belongs includes:

using a maintained cluster information table to determine the trusted computing cluster to which the first trusted computing unit belongs and each trusted computing unit included in the trusted computing cluster.

10. A non-transitory storage medium having computer executable instructions stored thereon, which when executed by one or more processors, configure the one or more processors to perform acts including:

receiving, from a first trusted computing unit, an encrypted key, the encrypted key corresponding to a trusted channel between the first trusted computing unit and a user outside a trusted computing environment of the first trusted computing unit;

determining a trusted computing cluster to which the first trusted computing unit belongs; and sending the encrypted key to a second trusted computing unit of the trusted computing cluster, enabling the second trusted computing unit to decrypt the encrypted key using a cluster key of the trusted computing cluster to obtain a session key for the trusted channel and to join the trusted channel based on the session key.

11. The storage medium according to claim 10, wherein the acts include:

receiving from the first trusted computing unit, a session identifier corresponding to the trusted channel; and obtaining, based on the session identifier, a list of trusted computing units of the trusted computing cluster that join the trusted channel, the list including the first trusted computing unit.

12. The storage medium according to claim 11, wherein the acts include:

before the sending the encrypted key to the second trusted computing unit of the trusted computing cluster, removing all trusted computing units from the list except for the first trusted computing unit.

13. The storage medium according to claim 10, wherein the acts include:

receiving, from the first trusted computing unit, a request for an identifier with respect to the trusted channel;

allocating a session identifier to the trusted channel in response to the request; and adding the first trusted computing unit to a list of trusted computing unit of the trusted computing cluster corresponding to the session identifier.

14. The storage medium according to claim 13, wherein the acts include:

sending the session identifier to the second trusted computing unit; and adding the second trusted computing unit to the list of trusted computing units.

15. The storage medium according to claim 10, wherein the determining the trusted computing cluster to which the first trusted computing unit belongs includes:

using a maintained cluster information table to determine the trusted computing cluster to which the first trusted computing unit belongs and each trusted computing unit included in the trusted computing cluster.

16. A computing device, comprising:

a processor;

a memory having computer executable instructions stored thereon, which, when executed by the processor, configure the processor to perform acts including:

receiving, from a first trusted computing unit, an encrypted key, the encrypted key corresponding to a trusted channel between the first trusted computing unit and a user outside a trusted computing environment of the first trusted computing unit;

determining a trusted computing cluster to which the first trusted computing unit belongs; and sending the encrypted key to a second trusted computing unit of the trusted computing cluster, enabling the second trusted computing unit to decrypt the encrypted key using a cluster key of the trusted computing cluster to obtain a session key for the trusted channel and to join the trusted channel based on the session key.

17. The computing device according to claim 16, wherein the acts include:

receiving from the first trusted computing unit, a session identifier corresponding to the trusted channel; and obtaining, based on the session identifier, a list of trusted computing units of the trusted computing cluster that join the trusted channel, the list including the first trusted computing unit.

18. The computing device according to claim 17, wherein the acts include:

before the sending the encrypted key to the second trusted computing unit of the trusted computing cluster, removing all trusted computing units from the list except for the first trusted computing unit.

19. The computing device according to claim 16, wherein the acts include:

receiving, from the first trusted computing unit, a request for an identifier with respect to the trusted channel;

allocating a session identifier to the trusted channel in response to the request; and adding the first trusted computing unit to a list of trusted computing unit of the trusted computing cluster corresponding to the session identifier.

20. The computing device according to claim 19, wherein the acts include:
sending the session identifier to the second trusted computing unit; and
adding the second trusted computing unit to the list of trusted computing units.

* * * * *